Patented Apr. 24, 1945

2,374,474

UNITED STATES PATENT OFFICE 2,374,474

EMULSION PASTE WAXES

Frank E. Dolian, Terre Haute, Ind., assignor to Commercial Solvents Corporation, Terre Haute, Ind., a corporation of Maryland No Drawing. Application February 22, 1943, Serial No. 476,765

4 Claims. (Cl. 106—8)

My invention relates to coating compositions, and, in particular, to improved coating compositions of the emulsion paste wax variety.

Paste wax polishes have been in rather extensive use for some time. Such materials find wide application in the surface treatment of floors, furniture, linoleum, leather, woodwork, and the like, and although previous wax polishes, employed for such purposes, gave satisfactory finishes, their use was limited, and their application hazardous owing to the presence of volatile and highly inflammable solvents therein. Other wax polishes of the liquid self-polishing type, which also have previously been employed for the above-mentioned uses, give, on drying, bright glossy films, but, because of the relatively low solids content of these polishes, the resulting films are quite thin, and rather easily destroyed.

I have now discovered that emulsion paste wax polishes which exhibit unusually good spreading properties, and possess none of the aforesaid disadvantages, may be prepared by incorporating in a suitable paste wax emulsion a small proportion of a lower aliphatic glycol, such as 2-methyl-2,4-pentanediol and the like. One of the outstanding and surprising characteristics of the emulsion paste wax polishes of my invention, is the fact that only a small quantity of glycol is required to greatly reduce the viscosity, and hence increase the spreading properties of such polishes many fold. The ability of polishes of the aforesaid type to spread, is obviously a property of much importance in the use of these compositions, since the quantity of polish required to perform a given piece of work, is materially decreased, and, at the same time, such compositions tend to penetrate crevices and openings, and provide a protective coating for surfaces which, with previous polishes, were not at all or only partially preserved.

Waxes employed in the preparation of the coating compositions of the present invention may be selected from a comparatively large group of sbstances, such as, for example, montan wax, hydrogenated castor oil, carnauba wax, Japan wax, beeswax, paraffin wax, ceresine, ozokerite, candelilla wax, and the like. It will be apparent to those familiar with the formulation of emulsion paste wax polishes, that the desired characteristics of the protective coating will, for the most part, determine which particular wax, or combination of waxes, is to be selected. Thus, for example, if relatively hard and durable finishes are desired, a comparatively high proportion of carnauba wax should be utilized, or if a film of considerable plasticity is wanted, sizable quantities of beeswax should be incorporated.

The emulsifying agents employed may be any of several types. However, I prefer to use those prepared from a higher fatty acid and an aliphatic aminohydroxy compound. Emulsifying agents of this class may be produced either by the procedure described in U. S. Patent No. 2,281,177 or U. S. Patent No. 2,247,106. The former patent is concerned with the manufacture of emulsifying agents from the higher fatty acids and aliphatic amino monohydric alcohols, while the latter relates to the use of polyhydric amino compounds with higher fatty acids to produce materials having emulsifying properties. The general method for preparing such substances involves the reaction, at approximately room temperature, of the desired aminohydroxy compound with a suitable fatty acid in stoichiometric proportions and agitating the resulting mixture for a period of from three to five minutes. The product thus produced may then be incorporated in the desired amount into the material to be emulsified.

The fatty acids utilized in the preparation of the above-mentioned emulsifying agents, may likewise be selected from a large group of compounds. Examples of fatty acids suitable for this purpose are stearic acid, oleic acid, linoleic acid, palmitic acid, soy bean oil fatty acids, and the like. The glycols which I prefer to utilize for improving the spreading properties of the coating compositions contemplated by the present invention, are 2-methyl-2,4-pentanediol, and the like. The amount of glycol necessary to effect this improvement in the spreading properties of such waxes will, of course, be found to vary with the composition of the particular wax under consideration. In general it may be said that from about 1 to 5 per cent glycol based upon the weight of the total composition will be found adequate. For the most part, however, I have found it preferable to employ a narrower range, i. e., from between about 1.5 to 3 per cent of glycol, based on the quantity of paste wax emulsion utilized.

In preparing the improved coating compositions of the present invention, the wax ingredient thereof, which may consist of one or more specific waxes, depending upon the desired characteristics of the protective film, is mixed with the fatty acid component of the emulsifying agent, and the whole melted, preferably on a steam bath. The desired aminohydroxy compound is then stirred into the wax melt, the temperature of which should not substantially exceed 100° C. at this point. Thereafter, a hot solution of glycol in water is added thereto with vigorous stirring. The consistency of the resulting product may be varied considerably, depending, of course, upon the relative proportion of water added.

The following example will further illustrate the nature of this invention, but it is to be understood that the various coating compositions included within the scope thereof are not restricted to such examples. The parts given are by weight.

*Example*

A mixture consisting of 14 parts carnauba wax, 14 parts beeswax, 14 parts paraffin wax, and 5 parts stearic acid was placed in a suitable container and melted by means of a boiling-water bath. After this mixture had completely melted, 2.5 parts of 2-amino-2-methyl-1-propanol was added thereto with stirring, at a temperature of approximately 100° C. Thereafter, a hot solution consisting of 75 parts water and 5 parts 2-methyl-2,4-pentanediol was introduced with vigorous agitation. The resulting product was a soft paste, which spread very easily, producing a rapid drying film which could be readily buffed. The emulsion paste wax, thus produced, is eminently suited as a polish for linoleum, leather, furniture and floors (wood, rubber, or asphalt composition).

It will be apparent that if polishes are desired possessing a heavier consistency than that of the composition furnished by the example listed above, additional amounts of water can be removed from the formulas. Thus, it may be seen that by the present invention, emulsion paste wax polishes, having improved spreading properties, may be manufactured to meet substantially any type of polishing or surface-preserving problems related to woodwork, linoleum, leather, and the like. It should also be noted that the polishes of the present invention possess a further advantage over those previously employed, in that the former do not contain highly volatile and inflammable solvents. Likewise, because such compositions do not contain solvent materials ordinarily employed in polishes of this type, they may be used on rubber and asphalt composition floors without the harmful effects that accompany the use of other polishes containing the common solvents. A still further advantage of my emulsion paste wax polishes, over the liquid self-polishing compositions, constitutes the fact that a higher concentration of solids is present in the polishes of my invention, and thus makes possible the procurement of heavier and more durable protective films.

It will be evident that numerous modifications and equivalents of the materials specifically mentioned in the foregoing description, may be employed without departing from the scope of my invention. It is therefore to be understood that any such equivalents, or modifications, are to be considered as lying within the scope thereof.

What I claim is:

1. A polishing composition possessing improved spreading properties, comprising a wax emulsion having incorporated therein from between about 1.5 and 3 per cent of 2-methyl-2,4-pentanediol which functions to improve the spreading properties of said composition.

2. A method for improving the spreading properties of emulsion paste wax polishes, which comprises incorporating therein from between about 1.5 and 3 per cent of 2-methyl-2,4-pentanediol.

3. A method for preparing a polishing composition having improved spreading properties which comprises preparing a melted wax mixture, adding thereto as an emulsifier a higher fatty acid and an aliphatic amino alcohol selected from the group consisting of aliphatic amino monohydric alcohols and aliphatic amino dihydric alcohols in such proportions that the fatty acid soap of the amino hydroxy compound is formed in situ; adding with vigorous agitation to the mixture thus obtained, a dilute hot water solution of 2-methyl-2,4-pentanediol as a spreading agent and continuing the agitation until a homogeneous soft paste is formed.

4. An emulsion wax paste of superior spreading qualities comprising a homogeneous mixture of a wax, an emulsifier comprising a higher fatty acid soap of an alcohol selected from the group consisting of aliphatic amino monohydric alcohols and aliphatic amino dihydric alcohols; a small quantity of 2-methyl-2,4-pentanediol to improve the spreading characteristics and sufficient water to impart a soft, pasty consistency to the emulsion.

FRANK E. DOLIAN.